(12) United States Patent
Lee

(10) Patent No.: US 8,483,614 B2
(45) Date of Patent: Jul. 9, 2013

(54) HID PROTOCOL-BASED SOFT KEYBOARD TOGGLE WITH INITIALIZATION AND SYNCHRONIZATION CAPABILITY FOR MOBILE PHONES AND PDAS CONNECTED TO A PERIPHERAL DEVICE

(75) Inventor: Hanjin Lee, Skillman, NJ (US)

(73) Assignee: Koamtac, Inc., Princeton, NJ (US)

( * ) Notice: Subject to any disclaimer, the term of this patent is extended or adjusted under 35 U.S.C. 154(b) by 334 days.

(21) Appl. No.: 13/018,286

(22) Filed: Jan. 31, 2011

(65) Prior Publication Data

US 2012/0196539 A1    Aug. 2, 2012

(51) Int. Cl.
*H04B 7/00* (2006.01)
(52) U.S. Cl.
USPC ............... 455/41.2; 235/462.46; 235/472.02; 709/232
(58) Field of Classification Search
None
See application file for complete search history.

(56) References Cited

U.S. PATENT DOCUMENTS

| | | | |
|---|---|---|---|
| 7,260,357 B2 | 8/2007 | Hulvey | |
| 7,280,097 B2 | 10/2007 | Chen et al. | |
| 7,377,441 B2 * | 5/2008 | Wiklof et al. | 235/472.02 |
| 2006/0007126 A1 | 1/2006 | Shih | |
| 2008/0320190 A1 | 12/2008 | Lydon et al. | |
| 2009/0196209 A1 | 8/2009 | Haartsen | |
| 2009/0240842 A1 | 9/2009 | Wang et al. | |
| 2010/0180063 A1 | 7/2010 | Ananny et al. | |
| 2010/0203838 A1 | 8/2010 | Ding | |
| 2010/0312919 A1 | 12/2010 | Lee et al. | |
| 2011/0171908 A1* | 7/2011 | Hua | 455/41.2 |

FOREIGN PATENT DOCUMENTS

| | | |
|---|---|---|
| WO | WO2009/002786 A2 | 12/2008 |
| WO | WO2009/063272 A1 | 5/2009 |

OTHER PUBLICATIONS

KoamTac A new Wave in Auto ID User Manual KDC300, Dec. 2009, Revision 2.86F, pp. 1-103.*
KoamTac A new Wave in Auto ID User Manual KDC300, Sep. 2010, Revision 2.86G, pp. 1-114.*
Ranta et al., Human Interface Device (HID) Profile, May 22, 2003, Version 1.0 Adopted, pp. 1-123.*
Show on Screen Keyboard When Scanfob 2002 Barcode Scanner Connected to iPad, Dec. 13, 2010, p. 1.*
Setup for connecting Scanfob 2002 via Bluetooth as a Keyboard, Dec. 14, 2010, pp. 1-2.*

* cited by examiner

*Primary Examiner* — Nay A Maung
*Assistant Examiner* — Alejandro Rivero
(74) *Attorney, Agent, or Firm* — Robert Gorman; Gorman Law Offices

(57) ABSTRACT

The present invention relates to a method and apparatus for employing a specialized key on a peripheral device such as a bar code scanner that can enabled the direct manipulation of a soft keyboard function on a smart device such as a iPhone® or iPad® or iPod® touch without either a suspension or disconnection of the connection via Bluetooth® between the bar code scanner and the smart device, and without any data loss being incurred from latency periods in the smart device.

10 Claims, 4 Drawing Sheets

Toggle Command Options (205-215)

Sleep Mode/Wake up Options (220 -260)

Synchronization Options (265 -275)

US 8,483,614 B2

HID PROTOCOL-BASED SOFT KEYBOARD TOGGLE WITH INITIALIZATION AND SYNCHRONIZATION CAPABILITY FOR MOBILE PHONES AND PDAS CONNECTED TO A PERIPHERAL DEVICE

FIELD OF THE INVENTION

The present invention relates to a method for controlling a mobile phone or PDA such as a iPhone® or iPad® or iPod® touch to be used, through special features for a peripheral device, and more particularly, relates to a method for controlling the soft keyboard of an iPhone® or iPad® or iPod® touch and improved methods for controlling the transmission of data from a peripheral device to the given mobile phone or PDA.

DISCUSSION OF THE RELATED ART

Recently, a mobile terminal, mobile phone or PDA such as a iPhone® or iPad® or iPod® touch are becoming widely used as more than mere communication or media devices. There are a variety of applications for such mobile terminals, that strive to amplify the abilities of such terminals for additional purposes that may be achieved through the use of special use peripherals that can be connected thereto.

However, when the mobile terminal is connected to certain peripheral devices, especially when utilizing the normative HID-protocol based connection, certain functions used in the mobile device or terminal, such as the illustrative soft keyboard of an iPhone® or iPad® or iPod® touch are disabled upon establishment of the Bluetooth® connection therebetween. This poses a problem for users, as these functions are often needed during a given session of connectivity.

Accordingly, in order to implement the soft keyboard function of the mobile terminal in the mobile device according to most conventional schemes found in HID profiles used in such devices, an additional step of shutting down the Bluetooth® connection is required, resulting in greater user inconvenience. As such, previous approaches for using the soft keyboard of an iPhone® or iPad® or iPod® touch have therefore been hitherto wholly limited to the inconvenient approach of ensuring complete disconnection of the peripheral device or other apparatus to the iPhone® or iPad® by completely disconnecting a given peripheral or by fully shutting down the Bluetooth Power via the ON/OFF feature therein. Furthermore, Bluetooth® connections between the peripheral device and the mobile device are further complicated by data transmission loss caused by mobile terminal latency periods and by ineffective or non-existent synchronization schemes.

SUMMARY OF THE INVENTION

Accordingly, the present invention is directed to a method for controlling the mobile terminal to be used through a peripheral device that substantially obviates one or more problems due to limitations and disadvantages of the related art.

An object of the present invention is therefore to provide a method for controlling a mobile terminal effectively through a peripheral device that has been provided with the novel functionality, so that one can easily employ the soft keyboard of a mobile device such as an iPhone® or iPad® or iPod® touch simply by pressing a "soft keyboard toggle" function button on the handheld barcode scanning device or other apparatus, while the same is currently connected via a Bluetooth® HID-protocol based connection to the iPhone® and/or the iPad® and/or the iPod® touch. The Bluetooth® HID profile defines the protocols, procedures, and features to be used by Bluetooth® HID-based peripherals such as keyboards, pointing devices, gaming devices, remote monitoring devices and bar code scanning devices. Devices such as the iPhone® and/or the iPad® and/or the iPod® touch support Bluetooth HID-based profiles, but prevent user use of the "soft keyboard" while connected to such peripherals, especially if the peripherals do not also have keyboards for inputting data. Thus, especially popular peripherals like barcode scanners can be connected to an iPhone® and/or the iPad® and/or the iPod® using the industry standard HID profile, but must disconnect the HID connection if user needs to enter data using soft keyboard. As such, fast HID connection and disconnection is a desirable feature. Thus, it is a goal of the present invention to remedy the aforementioned deficiencies through proprietary definition of toggle key(s) to not only connect and disconnect HID connections to provide the fastest connection and disconnection method, but also to provide for soft keyboard usage during such connections in cases where an HID toggle command is supported.

Another object of the present invention is therefore to provide a method for controlling a mobile terminal effectively through a peripheral device in such a way so as to overcome the limitations of the normal HID profile normally employed in such connections, particularly where a given peripheral device (such as an illustrative barcode reader) is connected to the iPhone® or iPad® or the iPod® touch. More specifically, it is an object of the present invention to not only avoid the significant limitations on the use of soft keyboards or "touch" functions found on such mobile devices, but also to avoid the commonly encountered instances of lost or corrupted data collections emanating from the connections therebetween that stem from mobile device latency and incomplete solutions for data synchronization.

Technical subject matters to be realized by embodiments of the present invention are not limited to the following technical subject matters, and other technical subject matters not mentioned in the following description may be easily appreciated by those skilled in the art to which the present invention pertains, without difficulty.

Additional advantages, objects, and features of the invention will be set forth in part in the description which follows and in part will become apparent to those having ordinary skill in the art upon examination of the following may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the proposed invention relates to a novel approach to use hand held devices such as compact bar code scanners to toggle the "soft keyboard" or other similar feature on mobile phones and PDAs such as the iPhone® and/or the iPad® and/or the iPod® touch. Such toggling of the soft key board on mobile phones and PDAs such as the iPhone® and/or the iPad® and/or the iPod® is deemed greatly desirable because a "soft keyboard" or other similar feature is normally disabled when a device (such as an illustrative handheld or compact barcode scanning device) is connected via an active Bluetooth® HID-protocol based connection. The inventive toggling is especially valuable in that permits usage of the soft key board on mobile phones and PDAs such as the iPhone® and/or the iPad® and/or the iPod® touch while connected to an illustrative handheld barcode scanning device or other apparatus that may be connected via a Bluetooth® HID-protocol based connection. Specifically, inventive method utilizes a soft keyboard toggle function (similar to keyboard F1/F2/ ... function keys) within the HID protocol in order to turn the Bluetooth connection ON/OFF in a rapid fashion so as to control the soft keyboard of an iPhone® or iPad® or iPod® touch using a "soft keyboard toggle" function that has been predefined in one of the extra buttons of the handheld barcode scanning device or other apparatus. Provision of such means that one can easily employ the soft keyboard of an iPhone® or iPad® or iPod® touch simply by pressing a "soft keyboard toggle" function button on the handheld barcode scanning device or other apparatus while the same is currently connected via a Bluetooth® HID-protocol based connection to the iPhone® and/or the iPad® and/or the iPod® touch. Previous approaches for using the soft keyboard of an iPhone® or iPad® or iPod® touch have been hitherto limited to the complete disconnection of the handheld barcode scanning device or other apparatus to the iPhone® or iPad® in order to re-engage or use then-disabled soft keyboard function.

Also, the present invention further provides for the additional features of: (1) an HID device wake up method whereby an iPhone® or iPad® or iPod® touch is woken up before transmitting the data of the handheld barcode scanning device or other apparatus which prevents accidental data loss that would normally occur during the brief period of latency when the iPhone® or iPad® or iPod® touch does not receive the first portions of a data stream as a result of it being in a sleep mode that may normally occur during overall system usage; and (2) an HID synchronization method that avoids the normal real time data transmission default and defines an approach to downloading collected (stored) data from the handheld barcode scanning device or other apparatus over a given HID profile in a batch format.

As such, the present invention overcomes this and other disadvantages inherent in the prior art.

It is to be understood that both the foregoing general description and the following detailed description of the present invention are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
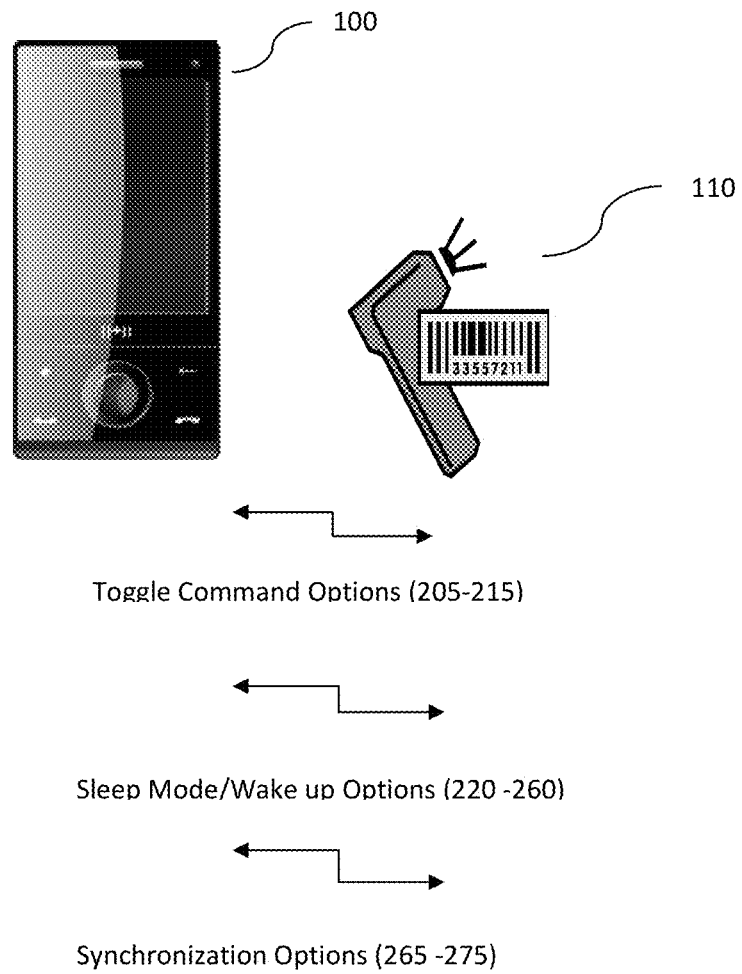
FIG. 1 depicts an illustrative mobile terminal and a host device and a broad recitation of some of the novel operations performed therebetween according to one embodiment of the present invention.

At its broadest level, the present invention relates to a method and apparatus whereby a peripheral device can provide for improved interoperability between the peripheral device and a mobile terminal connectable thereto via a Bluetooth® wireless connection, wherein the peripheral device comprises: (a) a memory unit configured to store instructions; (b) at least one configurable key for selecting at least one of the following of a toggle command, a wake up process and a synchronization process; (b) a processor connected to the at least one key, both of which are configured to execute instructions for executing the following instructions: (c) establishing a connection via Bluetooth® between at least one peripheral device and the mobile terminal; (d) determining whether a toggle command is available in a Bluetooth® HID-based profile within the connection via Bluetooth® between at least one peripheral device and the mobile terminal; (e) defining, when no toggle command is available in the Bluetooth® HID-based profile, at least one key on the peripheral device as an ON/OFF toggle key manually; (f) defining, when the toggle command is available in the Bluetooth® HID-based profile, at least one key on the peripheral device as a soft keyboard toggle key manually; (g) determining whether there is an indication of missing data due to the mobile terminal being in a sleep mode; (h) setting, when the indication of said missing data has been determined not to exist, an autolock time to zero in the peripheral device; (i) setting, when the indication of the missing data has been determined to exist, a wakeup delay of a predetermined length of time, and upon an expiration of the predetermined length of time, setting the autolock time in the peripheral device to a preference previously set within the mobile terminal; (j) executing a data collecting function of the peripheral device and then computing an elapsed time from a previous data collecting function of the peripheral device; (k) determining whether the elapsed time from a previous data collecting function of the peripheral is greater than the autolock time; (l) sending, where the elapsed time from a previous data collecting function of the peripheral has been determined to be greater than the autolock time, a wake up character from the peripheral device to the mobile terminal, and thereafter establishing an idle period for the peripheral device until a predetermined wakeup delay period has expired; (m) determining whether a synchronization option has been enabled within the Bluetooth® HID-based profile; (o) transmitting, where it has been determined that the synchronization option has not been enabled within said Bluetooth® HID-based profile, data collected during the data collecting function of the peripheral device, according to a real time mode; and (p) transmitting, where it has been determined that the synchronization option has been enabled within the Bluetooth® HID-based profile, any stored data that has been collected during the data collecting function of the peripheral device, according to either a full download mode or a partial download mode. In additional embodiments, the peripheral device of which executes the above steps is done by a peripheral device that comprises a bar code scanner that has a configurable key for controlling the soft keyboard of the mobile terminal (such as the illustrative KDC® 200 or KDC® 300 type unit, available from KoamTac® Inc., of Princeton, N.J.), and to that end, the data collecting function comprises the step of executing a bar code scan operation and the data collected during the data collecting function comprises bar code scan data. In further embodiments, the mobile terminal comprises a smart device chosen from the group comprising an iPhone® or iPad® or iPod® touch (available from Apple, Inc. of Cupertino, Calif.), such that where a toggle command is available in the Bluetooth® HID-based profile, at least one key on the bar code scanner enables the direct manipulation of a soft keyboard function on the smart device without either a suspension or disconnection of the connection via Bluetooth® between the bar code scanner and said smart device.

Reference will now be made in detail to the illustrative embodiments of the present invention, examples of which are illustrated in the accompanying drawings. Wherever possible, the same reference numbers will be used throughout the drawings to refer to the same or like parts. Constituent components and operations of the present invention shown in the drawings will be disclosed only for illustrative purposes of the present invention, such that technical spirit, important constructions and operations of the present invention are not limited to only the following embodiments, and can also be applied to other embodiments.

FIG. 1 illustrates an example mobile terminal 100 and a peripheral device 110 according to the present invention. As further shown in FIG. 1, the mobile terminal 100 may be connected to the peripheral device 110 through a Bluetooth® protocol. Those skilled in the art will appreciate that various modifications, additions and substitutions are possible from this description, but in general, mobile terminal 100 is of the type chosen from the groups comprising an iPhone®, iPad® or iPod® touch (available from Apple, Inc. of Cupertino, Calif.) and includes a display for implementing interactivity with a user. This display has a "soft keyboard" that is frequently used by a user in order to input data. The bar code scanner has a configurable key for controlling the soft keyboard of the mobile terminal, such as that found in the illustrative KDC® 200 or KDC® 300 type unit, available from KoamTac® Inc., of Princeton, N.J., and includes a relatively smaller display for interactivity with a user, and may provide the user with different menu screens for the various functions described herein. Other menu images can be implemented on the display as necessary.

Figure 2:
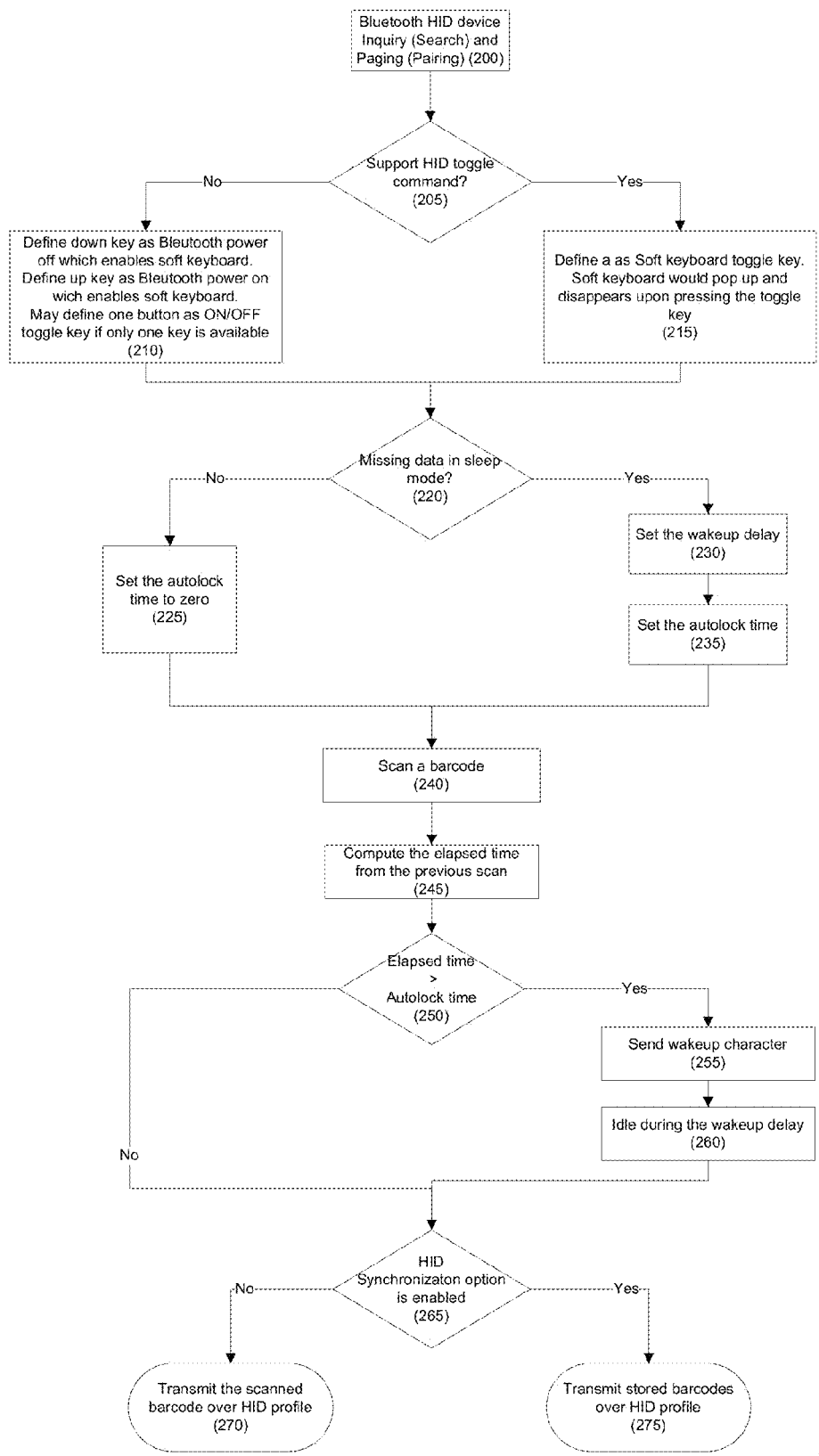
FIG. 2 is a flow chart illustrating an operational relationship between a mobile terminal and a peripheral device according to one embodiment of the present invention.

FIG. 2 illustrates an example of the overall process flow of the various inventive aspects that can be implemented in a peripheral device 110 according to one embodiment of the present invention. As seen therein, peripheral device 110 and mobile terminal 100 are paired at step 200, and software coded or downloaded onto on peripheral device 110 executes the steps remaining, starting with step 205, whereby a determination is made as to whether the current hardware involved supports a native HID toggle command. If it does not, then at step 210, one or more keys may be defined for establishing a quick connect/disconnect (e.g., ON/OFF) of the Bluetooth® connection between the devices. Otherwise, if supported, then at step 215, a soft keyboard toggle key may be defined whereby the soft keyboard may be controlled so as to appear and disappear on the screen of the mobile terminal upon pressing of the changeable (e.g., defined) key, even while there is still a Bluetooth® connection between the two devices.

Within this scheme, additional features may be utilized according to the present invention. For example, the HID-based Bluetooth® connection can be disconnected automatically if it becomes idle for a predefined time period, in order to reduce the device power consumption on the devices, and similarly, can be reconnected automatically, upon a predetermined action, such as upon scanning a barcode. Also, the present invention also contemplates a way in which to overcome inherent limitations in previous approaches due to mobile terminal system latency periods. For example, the present method also can define a key in such a way so as to wake up a latent (e.g., sleeping) iPhone®, iPad® or iPod® touch before transmitting the data collected (e.g., barcode). Provision of such prevents accidental data loss that normally results from known HID devices which cannot wake up a sleeping iPhone®, iPad® or iPod® touch and as such, cannot receive the data properly because inevitably the first few characters of a data transmission stream go missing due to the mobile terminal being in sleep mode at the beginning of transmission. Additionally, the present invention also contemplates synchronization of data between the two devices by defining a way to download collected data (e.g., bar code scan data from a bar code scanner) over a HID profile. More specifically, HID profiles use real time data transmission only, which the present invention can certainly accommodate, but this mode, as previously known, does not allow for mobile terminal 100 system latency periods when transmitting data. However, this invention also extends the usage of HID profiles by providing for the download of stored data (e.g., data that was collected during period of latency or other condition) by the peripheral device 110 so as to allow for synchronization over an HID profile by either full download or partial download. The meaning of full download can be understood to mean that, upon waking up of a latent mobile terminal 100, all data collected by the data collector (e.g., bar code scan data from a bar code scanner) is sent as a batch, or all at once processing and transmission. Conversely, if partial download is enabled through a menu or key input, it means that the barcode scanner (peripheral device 110) records the last downloaded data, and starts the synchronization process from the next scan barcode (e.g., where the system last left off, as cross-checked with the data resident on both devices), until the last downloaded barcode.

Returning then, to FIG. 2, the above additional features are therein described in steps 220-275. As then depicted in step 220, the inventive system provides for a determination as to whether there is missing data in the sleep mode, which essentially means that most mobile devices go into sleep mode after predefined time period to conserve power consumption and as such, cannot process the first few incoming characters during the sleep mode in contrast to most non-mobile devices such as desktop PCs, which do not go into sleep mode and which may not lose incoming characters. Typically, the Autolock time may be defined by the user (in some embodiments, this time value may be automatically shared between devices by transfer of data indicating the specific time length, or manually entered if not shared) and defines the total amount of wakeup (e.g., active time) period of a mobile terminal 100 before entering sleep mode (e.g., the device would not go into sleep mode until the expiration of 10 minutes from the time of last user activity if the autolock time is set to say, 10 minutes). If it has been determined that there is no data missing due to the sleep mode, then the autolock time is set to zero, which means that the autolock feature will not be set on the iPhone®, iPad® or iPod® touch. If has been determined that there is data missing due to the sleep mode, then a wake up delay equal to iPhone®, iPad® or iPod® touch autolock minutes is set in steps 230, and thereafter, the autolock time is set at 235 to the user defined setting previously established in the mobile terminal 100. Thereafter, the peripheral data collection function (barcode scan operation) is performed at step 240, and then a computation is made at step 250 as to whether the (currently measured) elapsed time is greater than the autolock time. If it is greater, then at step 255 a wake up character is sent from the peripheral device 110 to the mobile terminal 100, and thereafter, at step 260, a certain period of time is set during the wake up delay by the user (or in some embodiments, automatically by transfer of data indicating the specific time length), the length of which might be illustratively characterized as 0.5 seconds in length, or any other time value between 0.1 to 1.0 seconds, depending on the subject mobile terminal 100. Lastly, a HID-profile based synchronization may be enabled. If it is not enabled, the collected data (e.g., scanned bar code data) may be transmitted over the HID profile to the mobile terminal 100 in real time. If it is enabled, then the collected data (e.g., scanned bar code data) may be transmitted over the HID profile as stored, either in partial (e.g., updated from a left off transmission point) or full (e.g., batch) mode processing as described herein.

In using the described HID toggle function, one can therefore define a key as HID toggle button, which known bar code scanners, other than the illustrative KDC® 200 and KDC® 300 devices which are provided with three special keys, cannot do because they physically lack the buttons, among other things. One can use one toggle key or on/off switch to define both connection and disconnection. Or, one can define two buttons, one for connection and the other for disconnection. This connection and disconnection feature further can be expanded by alternative concepts, such as use of scanning a special barcode and provision of (a) predefined menu(s). Similarly, where HID toggle command are supported, one may define the above buttons or keys as "soft keyboard" keys which can pop up and disappear by pressing the key, even while the Bluetooth® connection is still extant. When provisioned as such, pressing the button or key on the peripheral device 110, as configured in accordance with the techniques described herein, will toggle the soft keyboard on the mobile terminal 100, and will minimize and/or eliminate interruptions or disconnections to the Bluetooth® connection between the devices.

Figure 3:
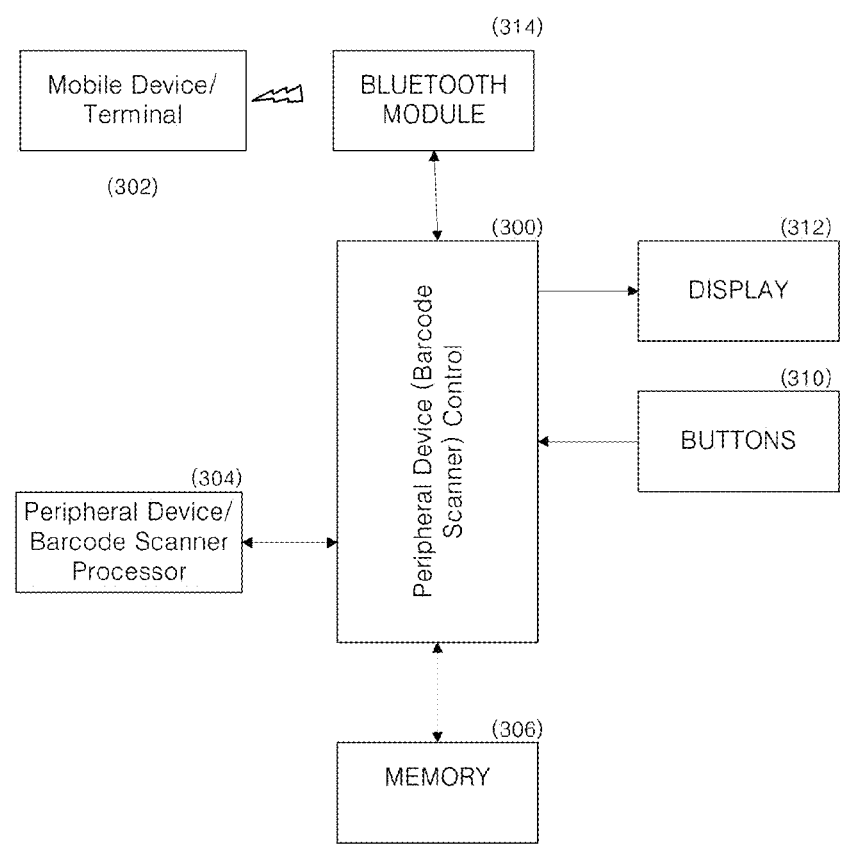
FIG. 3 is a block diagram of some of the electronic components of the peripheral device that implement the novel operations on the mobile terminal according to one embodiment of the present invention.

With attention to FIG. 3, an illustrative diagram is depicted of the hardware elements that may be found within a peripheral device, such as the exemplary bar code scanner 110, all of which may be employed in executing the various processes and steps of the present invention. As seen therein, is a bar code device controller 300 connected to memory 306, scanner processor 304, (at least one) configurable key(s) or buttons 310, display 312, and Bluetooth® module 314 for communications with a mobile device 302 (mobile terminal 100). Under the control of a controller 300, the Bluetooth® enabled peripheral device 110 employs each of the above to perform the inventive processes herein and the specific steps outlined in FIG. 2 in conjunction with the connected mobile device 100.

Figure 4:
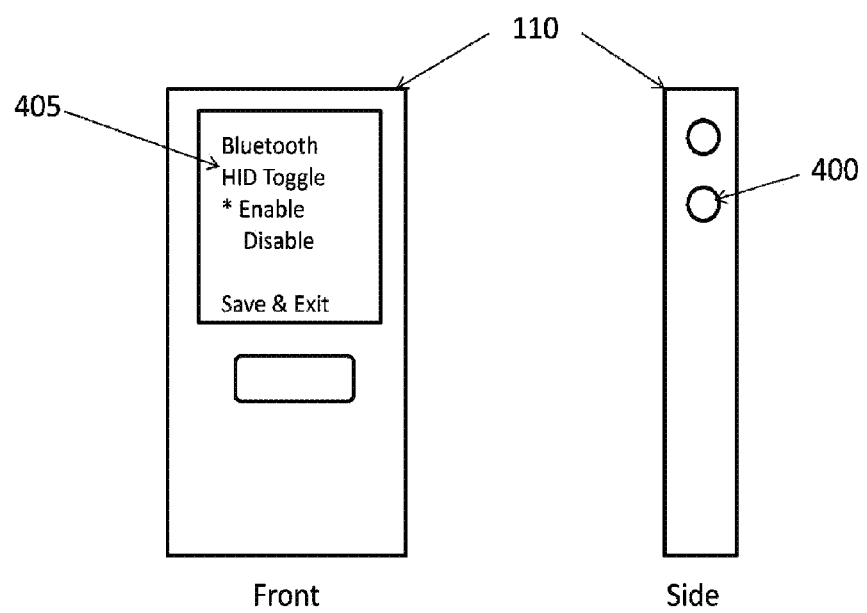
FIG. 4 depicts a frontal and side view of an illustrative mobile screen and configurable key(s) that are intended for user selection of the novel operations to be performed on or with any given connected mobile terminal.

FIG. 4 depicts a frontal and side view of a manually set (configurable) toggle key 400 and illustrative menu 405 of the bar code scanner or reader 110. A variety of menus or menu screens for example, may in some embodiments, be provided to the user through a display on the bar code scanner 110 for displaying to the user the selected options available in the novel method described herein. In additional embodiments, toggle key 400 could be defined through one or more of the following of: (1) a physical key (as depicted therein at 400); (2) a virtual key that is automatically triggered by initiation of a scanning operation where bar code reader 110 scans a special barcode; and/or (3) as voice recognition based command. Special Bluetooth® management software such as the KTSync® software which is available from KoamTac® Inc., of Princeton, N.J. may also be employed to effectuate provision of the above through bar code scanner having a configurable key for utilization in toggling the soft keyboard function described above. Alternatively, a unit such as the illustrative KDC® 200 or KDC® 300 type unit (available from KoamTac® Inc., of Princeton, N.J.) which already has specialized built in Bluetooth® management software (such as that found in KTSync®) therein may be used. It is worth noting, that, one generally would need to include a bar code scanning unit with programming capability or the ability to function with/without KTSync® type software downloaded therein, in order to provide the configuration options on the configurable key (e.g., toggle key 400) and menu 405, and for executing the logic steps outlined in FIG. 2. In any case, additional authentication (not depicted) may need to be done according to known approaches in the art of pairing such smart devices and peripheral devices, the sum of which may include entering a PIN, other authentication process as required by an iPhone® or other similar devices. Because devices such as the iPhone® and the iPad® request HID devices to enter PIN codes generated by iPhone and iPad during pairing process, a user can enter PIN code using keypad if HID device has keypad capability. In one alternative embodiment, the present invention may provide for a more convenient method of entering PIN code using the display of peripheral device 110 and a limited number of buttons through provision of easy PIN code access methodology. By way of example, an iPhone® generates a four digit random numeric PIN code and the iPad® generates a six digit random numeric PIN code. In the present invention, the peripheral device could be programmed so as to automatically display four digits of a combination of "4" and/or "5" such as "4444" or "5555" for say, the iPhone®. Similarly, the peripheral device could be programmed so as to automatically display six digits of a combination of "4" and/or "5" such as "444444" or "555555" for say, the iPad®. A user could then change the displayed PIN code (whether "4444" or "555555") and could use the up and down buttons on devices such as the KDC® 200 or KDC® 300 to compose random PIN codes generated by the iPhone® and/or iPad®. Provision of such is much more expedient than known approaches because the numerals "4" and "5" are the median numbers within the decimal system, and accordingly, by providing for this functionality, the present invention minimizes the time required for the entering of PIN codes during the pairing process. Alternatively, a user can also enter PIN code using other methods such, as barcode scanning and voice recognition as may be detailed in one of the following U.S. Patents: U.S. Pat. No. 8,347,366 B2, U.S. Pat. No. 8,126,399 B2, and U.S. Pat. No. 7,954,710 B2, the specifications of which are hereby incorporated by reference in their entireties.

I claim:

1. A method executed by at least one peripheral device for providing interoperability between said at least one peripheral device and a mobile terminal connectable thereto via Bluetooth wireless connection, said method comprising the steps of:
  (a) establishing a connection via Bluetooth between the at least one peripheral device and said mobile terminal;
  (b) determining whether a toggle command is available in a Bluetooth HID-based profile within said connection via Bluetooth between the at least one peripheral device and said mobile terminal;
  (c) defining, when no said toggle command is available in said Bluetooth HID-based profile, at least one key on said at least one peripheral device as an ON/OFF toggle key manually;
  (d) defining, when said toggle command is available in said Bluetooth HID-based profile, a soft keyboard toggle function according to one of the actions chosen from the group comprising: definition of at least one key on said at least one peripheral device as a soft keyboard toggle key; definition of a special barcode scan as a soft keyboard toggle key; or definition of voice recognition commands as a soft keyboard toggle key;
(e) determining whether there is an indication of missing data due to said mobile terminal being in a sleep mode;
(f) setting, when said indication of said missing data has been determined not to exist, an autolock time to zero in said at least one peripheral device;
(g) setting, when said indication of said missing data has been determined to exist, a wakeup delay of a predetermined length of time, and said autolock time to a user determined autolock time previously established in said mobile terminal;
(h) executing a data collecting function of said at least one peripheral device and then computing an elapsed time from a previous data collecting function of said peripheral device;
(i) determining whether said elapsed time from a previous data collecting function of said at least one peripheral device is greater than said autolock time;
(j) sending, where said elapsed time from previous data collecting function of said at least one peripheral device has been determined to be greater than said autolock time, a wake up character from said at least one peripheral device device to said mobile terminal, and thereafter establishing an idle period for said at least one peripheral device until a predetermined wakeup delay period has expired;
(k) determining whether a synchronization option has been enabled within said Bluetooth HID-based profile;
(l) transmitting, where it has been determined that said synchronization option has not been enabled within said Bluetooth HID-based profile, data collected during said data collecting function of said at least one peripheral device, according to a real time mode; and
(m) transmitting, where it has been determined that said synchronization option has been enabled within said Bluetooth HID-based profile, any stored data that has been collected during said data collecting function of said at least one peripheral device, according to either a full download mode or a partial download mode.

2. The method of claim 1, wherein steps (a)-(m) are executed by a peripheral device that comprises a bar code scanner, and wherein said data collecting function comprises the step of executing a bar code scan operation and wherein said data collected during said data collecting function comprises bar code scan data.

3. The method of claim 2, wherein steps (a)-(m) are executed by said bar code scanner together with a mobile terminal that comprises a smart device chosen from the group comprising an iPhone or iPad or iPod touch.

4. The method of claim 3, wherein said step of defining, when said toggle command is available in said Bluetooth HID-based profile, at least one key on said at least one peripheral device as a soft keyboard toggle key manually, enables the direct manipulation of a soft keyboard function on said smart device without either a suspension or disconnection of said connection via Bluetooth between said bar code scanner and said smart device.

5. The method of claim 4, wherein a step for providing a PIN code access by a user is provided.

6. A peripheral device for providing interoperability between said peripheral device and a mobile terminal connectable thereto via a Bluetooth wireless connection, said peripheral device comprising:
(a) a memory unit configured to store instructions;
(b) at least one configurable key for selecting at least one of the following of a toggle command, a wake up process and a synchronization process;
(c) a processor connected to said at least one key, configured to execute the following instructions:
(d) establishing a connection via Bluetooth between the peripheral device and said mobile terminal;
(e) determining whether a toggle command is available in a Bluetooth HID-based profile within said connection via Bluetooth between the peripheral device and said mobile terminal;
(f) defining, when no said toggle command is available in said Bluetooth HID-based profile, at least one key on said peripheral device as an ON/OFF toggle key manually;
(g) defining, when said toggle command is available in said Bluetooth HID-based profile, a soft keyboard toggle function according to one of the actions chosen from the group comprising: definition of at least one key on said peripheral device as a soft keyboard toggle key; definition of a special barcode scan as a soft keyboard toggle key; or definition of voice recognition commands as a soft keyboard toggle key;
(h) determining whether there is an indication of missing data due to said mobile terminal being in a sleep mode;
(i) setting, when said indication of said missing data has been determined not to exist, an autolock time to zero in said peripheral device;
(j) setting, when said indication of said missing data has been determined to exist, a wakeup delay of a predetermined length of time, and said autolock time to a user determined autolock time previously established in said mobile terminal;
(k) executing a data collecting function of said peripheral device and then computing an elapsed time from a previous data collecting function of said peripheral device;
(l) determining whether said elapsed time from a previous data collecting function of said peripheral device is greater than said autolock time;
(l) sending, where said elapsed time from a previous data collecting function of said peripheral has been determined to be greater than said autolock time, a wake up character from said peripheral device to said mobile terminal, and thereafter establishing an idle period for said peripheral device until a predetermined wakeup delay period has expired;
(n) determining whether a synchronization option has been enabled within said Bluetooth HID-based profile;
(o) transmitting, where it has been determined that said synchronization option has not been enabled within said Bluetooth HID-based profile, data collected during said data collecting function of said peripheral device, according to a real time mode; and
(p) transmitting, where it has been determined that said synchronization option has been enabled within said Bluetooth HID-based profile, any stored data that has been collected during said data collecting function of said peripheral device, according to either a full download mode or a partial download mode.

7. The peripheral device of claim 6, wherein steps (d)-(p) are executed by a peripheral device that comprises a bar code scanner, and wherein said data collecting function comprises the step of executing a bar code scan operation and wherein said data collected during said data collecting function comprises bar code scan data.

8. The device of claim 7, wherein steps (d)-(p) are executed by said bar code scanner together with a mobile terminal that comprises a smart device chosen from the group comprising an iPhone or iPad or iPod touch.

9. The device of claim 7, wherein said step of defining, when said toggle command is available in said Bluetooth HID-based profile, at least one key on said peripheral device as a soft keyboard toggle key manually, enables the direct manipulation of a soft keyboard function on said smart device without either a suspension or disconnection of said connection via Bluetooth between said bar code scanner and said smart device.

10. The device of claim 9, wherein a PIN code access is further provided therein.

\* \* \* \* \*